United States Patent [19]

Tanikawa

[11] Patent Number: 4,458,004
[45] Date of Patent: Jul. 3, 1984

[54] OPTICAL INFORMATION RECORDING MEDIUM

[75] Inventor: Kiyoshi Tanikawa, Yokohama, Japan

[73] Assignee: Ricoh Company, Ltd., Tokyo, Japan

[21] Appl. No.: 422,414

[22] Filed: Sep. 23, 1982

[30] Foreign Application Priority Data

Oct. 1, 1981 [JP] Japan ............................ 56-154842

[51] Int. Cl.$^3$ ............................................. G03C 1/78
[52] U.S. Cl. ................................ 430/270; 430/271;
430/273; 430/495; 430/496; 430/531; 430/533;
430/534; 430/535; 430/536; 430/445; 430/296;
430/961; 346/135.1
[58] Field of Search ................. 430/83, 945, 296, 270,
430/271, 495, 496, 273, 531, 961, 533–536, 523,
338; 346/135.1, 76 L; 260/245.82, 245.85

[56] References Cited

U.S. PATENT DOCUMENTS

| | | | |
|---|---|---|---|
| 4,214,907 | 7/1980 | Nakazawa et al. | 430/83 |
| 4,241,355 | 12/1980 | Bloom et al. | 346/135.1 |
| 4,300,143 | 11/1981 | Bell et al. | 430/945 |
| 4,312,935 | 1/1982 | Engler et al. | 430/338 |
| 4,372,893 | 2/1983 | Eckert | 260/245.82 |

*Primary Examiner*—Won H. Louie, Jr.
*Attorney, Agent, or Firm*—Flynn, Thiel, Boutell & Tanis

[57] ABSTRACT

An optical information recording medium capable of recording optical information thereon by application of high density energy beams thereto, the recorded information being thereafter reproducible therefrom, comprising a base and a recording layer formed on the base, the recording layer comprising a fluorine phthalocyanine of the following formula and capable of absorbing light with a wavelength of 700 nm or more:

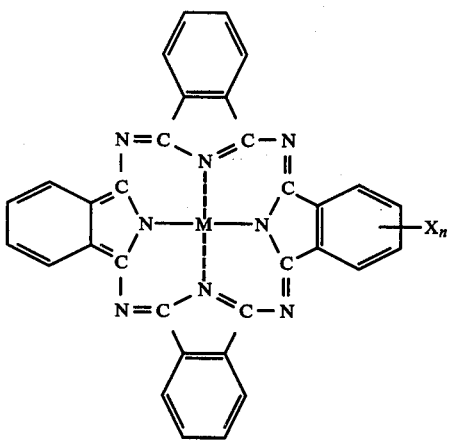

where M represents a member selected from the group consisting of hydrogen, a metal, a metal oxide and a metal halide, X represents fluorine; and n is an integer from 1 to 16.

12 Claims, 2 Drawing Figures

OPTICAL INFORMATION RECORDING MEDIUM

BACKGROUND OF THE INVENTION

The present invention relates to an optical information recording medium capable of recording information thereon by the application of high density energy beams thereto, the recorded information being thereafter reproducible therefrom, which optical information recording medium comprises a base and an improved information recording layer thereon, in which recording layer the recording is done by causing a change of state of the materials contained in the recording layer, such as a change in reflectance and/or in light transmission caused by fusing, vaporization, sublimation or other phase transformations, as the high density energy beams are applied thereto.

In the optical recording of information, a laser beam, for instance, is applied in image patterns or code patterns to a recording layer of an optical information recording medium, so that the laser beam is absorbed by the recording layer. The light energy imparted by the laser beam is converted to thermal energy within the recording layer. By the converted thermal energy, the materials contained in the recording layer are subjected to the above-mentioned changes of state in the image or code patterns so as to record the information in the recording medium.

In conventional optical information recording media, from which reading or reproduction of the recorded information is done by the so-called reflection method, the recording layer of the medium comprises a light-reflecting material, for example, aluminum or gold, coated with a light-absorbing material. By application of the laser beam, the light-absorbing material is vaporized and the underlying reflective material exposed. Thereafter, in the reproduction of the recorded information, a laser beam which is less intense than the laser beam employed for the recording is applied to the surface of the recording layer, and the difference in reflectance between the exposed light-reflecting material in the recorded areas and the non-reflective light-absorbing material in non-recorded areas is detected. From this detection, the recorded information is reproduced.

However, the use in those recording media of the aforementioned light-reflecting layer, formed separately from the coating of the light-absorbing material, makes the production process rather complex and the production cost high.

Moreover, those recording media (for instance, those disclosed U.S. Pat. No. 4,241,355 to Bloom et al. and Japanese Laid-Open Patent Application No. 55-97033) do not possess the high laser-beam absorption efficiency that would permit their use with semiconductor lasers, that is, cannot absorb wavelengths above 780 nm, although semiconductor lasers would themselves be extremely advantageous in terms of their lightness in weight, smallness in size and other practical advantages. Instead, with those recording media, high-cost, high-power lasers must be used.

Thus, what was lacking in the art heretofore was an optical information recording medium simple and economical to produce, which is efficient is absorption of laser beams of wavelengths of 780 nm or more (i.e., provides good recording efficiency), particularly beams from a semiconductor lasers, and which, after recording, exhibits high reflectance contrast between the recorded areas and the adjacent non-recorded areas (i.e., provides good reproduction performance).

SUMMARY OF THE INVENTION

It is therefore an object of the present invention to provide an inexpensive optical information recording medium free from the conventional shortcomings, which permits recording and reproduction of information with high efficiency by use of a semiconductor laser.

According to the present invention, the above described object can be attained by an optical information recording medium comprising a base and a recording layer formed on the base, and, if necessary, with a protective layer on the recording layer, which recording layer comprises a fluorine phthalocyanine free from metals or containing a metal, a metal oxide or a metal halide, and capable of absorbing light with a wavelength of 700 nm or more.

DETAILED DESCRIPTION OF THE PREFERRED EMBODIMENTS

An optical information recording medium according to the present invention comprises a base and an information recording layer formed on the base, which recording layer comprises a fluorine phthalocyanine free from metals or a fluorine phthalocyanine containing a metal, a metal oxide or a metal halide, which fluorine phthalocyanines are capable of absorbing light with a wavelength of 700 nm or more.

Figure 1:
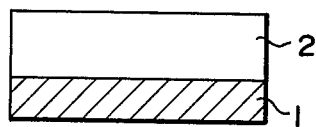
FIG. 1 is a schematic cross-sectional view of an embodiment of an optical information recording medium according to the present invention.
Figure 2:
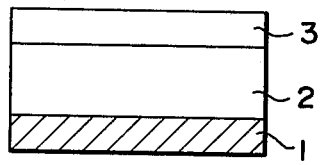
FIG. 2 is a schematic cross-sectional view of another embodiment of an optical information recording medium according to the present invention.

Referring to FIG. 1 and FIG. 2, there are shown two embodiments of an information recording medium according to the present invention.

The embodiment shown in FIG. 1 comprises a base 1 and a recording layer 2, while the embodiment shown in FIG. 2 comprises the base 1 and the recording layer 2, and an additional protective layer 3 on the recording layer 2. The protective layer 3 is not indispensable for the recording medium, but it is preferable to form the protective layer 3 on the recording layer 2.

As the base 1, any conventional materials employed in this field can be employed.

In recording, when laser beams are applied to the base side, the base material must be transparent to the laser beams. On the other hand, when laser beams are applied to the recording layer side which is opposite to the base side, it is unnecessary that the base be transparent to the laser beams for recording.

An example of a recording process by use of the optical information recording medium according to the present invention will now be explained. Information to be recorded is converted to, for example, digital signals. The digital signals are input to a laser, so that laser beams are generated in accordance with the input digital signals. The thus generated laser beams are converted to parallel laser beams by a first lens.

Since the laser beams which potentially bear the information to be recorded are linearly polarized light, a beam splitter permits passing of only one component of the linearly polarized light therethrough. The light component then passes through a ¼λ plate where the light component is converted to circularly polarized light, which is then focused on the recording layer by a second lens. By the incidence of the circularly polarized light on the surface of the recording layer 2, the previously described change of state is caused in the materials within the recording layer 2, whereby the digital-signal information is recorded in the form of digital pits in the recording layer.

When the recorded information is reproduced by laser light which is transmitted through the base, the base must be transparent to the transmission laser beams for reading.

On the other hand, when the recorded information is reproduced by reflected light, either a transparent base or an opaque base can be employed.

In the case where the information recorded by the above-described recording process is reproduced by reflected light, a laser beam which is less intense than the laser beam employed in the recording process is applied to the recording layer 2 where the information to be reproduced has been recorded in the form of digital pits.

The light reflected by the recording layer 2 is circularly polarized light. The circularly polarized light is then converted to parallel laser beams by the second lens employed in the recording process and are then caused to pass through the ¼λ plate where the parallel laser beams are converted to linearly polarized light. This linearly polarized light has already been changed in phase by 90° in comparison with the linearly polarized light emitted from the laser in the recording process. As a result, the linearly polarized light from the ¼λ plate does not pass through the beam splitter, but it is reflected by the beam splitter and is then projected to a light receiving device by which the information is reproduced.

As the material for the base of this recording medium, support materials employed for conventional recording materials, such as glass, plastics, paper, metal plates and metal foils, can be employed. Of these materials, plastics are most suitable for the base material, since they are safe for use, are suitable for obtaining high recording sensitivity, are capable of providing accurate flatness, and are light in weight and have excellent workability. As representative plastics, the following can be given: vinylchloride resin, vinyl acetate resin, acrylic resin, methacrylic resin, polyester resin, nitrocellulose, polyethylene, polypropylene, polyamide, polystyrene, polycarbonate, and epoxy resin.

The fluorine phthalocyanine for use in the recording layer of the optical information recording medium according to the present invention is represented by the following formula:

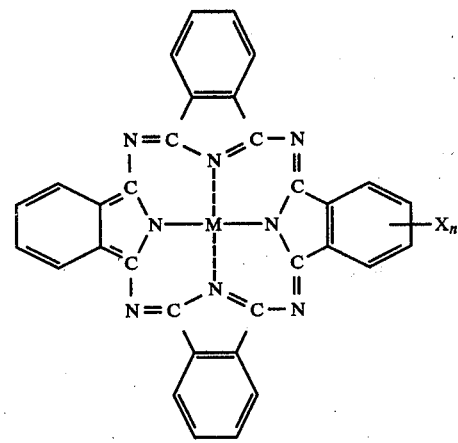

where M represents hydrogen, titanium oxide, vanadium oxide, copper, beryllium, magnesium, calcium, zinc, cadmium, barium, aluminum, tin, lead, vanadium, chromium, manganese, iron, cobalt, nickel or tin halide; X represents fluorine; and n represents an integer from 1 to 16.

In the above, it is preferable that M be tin, copper, zinc or lead, and X be 16.

The above fluorine phthalocyanines for use in the present invention absorbs light with a wavelength of 700 nm or more.

Specific examples of such fluorine phthalocyanines are as follows:
Dichlorotin [hexadecafluorophthalocyanine];
[Hexadecafluorophthalocyanine]copper;
[Hexadecafluorophthalocyanine]zinc; and
[Hexadecafluorophthalocyanine]lead.

In contrast, the conventionally employed metalophthalocyanines, in which the metal is cobalt, copper, iron, magnesium, nickel, palladium, zinc or tin, absorb light with a wavelength of 700 nm or more only slightly.

The thickness of the recording layer of the information recording medium according to the present invention is in the range of 100 Å to 5 μm, preferably in the range of 1000 Å to 3 μm. The recording layer can be formed by conventionally employed thin-film-formation methods, such as the vacuum evaporation method, the sputtering method, the ion plating method, the chemical vapor deposition method, the doctor blade method, the casting method, the spiner method, and the immersion method. Of these methods, the vacuum evaporation method is the best since it provides the best flatness and uniformity of the formed layer in an easy procedure.

When necessary, the previously mentioned resins employed for forming the base can be added as a binder resin to the recording layer.

In the optical information recording medium according to the present invention, the protective layer 3 can be formed on the recording layer 2 as shown in FIG. 2.

As the material for the protective layer 3, any material can be employed if it is transparent to the high density energy beams employed for recording, has high mechanical strength, is substantially unreactive with the recording layer 2 and has an excellent film formation capability.

Examples of such materials selected from inorganic materials are $Al_2O_3$, $SiO_2$, $SiO$, $MgO$, $ZnO$, $MgF_2$ and $CuF_2$. When the protective layer 3 is formed by use of one of these inorganic materials, the selected inorganic material is deposited with a thickness ranging from 50 Å to 5000 Å, preferably with a thickness ranging from 100 Å to 2000 Å, on the recording layer 2, by one of the conventional thin-film-formation methods, such as the previously mentioned vacuum evaporation method, sputtering method or ion plating method, or by the cluster ion beam method, or the glow discharge method.

Examples of materials for the protective layer selected from organic materials are organic polymeric materials, because of their advantageous film formation properties and workability, which include polystyrene, polyester resin, polycarbonate, polyxylene, vinylchloride resin, polyacrylonitirle, polymethacrylonitrile, polyacrylate, polymethacrylate, polyvinyl acetate, polyethylene, polypropylene, epoxy resin, polyamide, polyurea, phenol resin, and copolymers of the just mentioned polymers. When the protective layer 3 is formed by use of one of these organic materials, the selected organic material is deposited with a thickness ranging from 0.1 μm to 5 μm, preferably with a thickness ranging from 0.5 μm to 2 μm, on the recording layer 2, by one of the conventional thin film formation methods, such as the previously mentioned vacuum evaporation method, sputtering method, chemical vapor deposition method or glow discharge method, or by the solvent application method.

As the high density energy beams for use in the present invention, there can be employed electron beams and laser beams. In particular, the laser beams from a $N_2$ laser, a He-Cd laser, an Ar laser, a ruby laser, a semiconductor laser, and dye stuff lasers can be employed.

Referring to the following examples, the preparation and performance of embodiments of an optical information recording medium according to the present invention will now be explained, together with comparative examples.

EXAMPLE 1

In a vacuum chamber evacuated to $10^{-7}$ Torr an acrylic resin plate with a thickness of 1 mm was placed above dichlorotin[hexadecafluorophthalocyanine] in an evaporation source, with the temperature of the acrylic resin plate maintained at room temperature, so that evaporation was permitted to continue until a recording layer of the dichlorotin[hexadecafluorophthalocyanine] with a thickness of 2000 Å was formed on the acrylic resin plate, forming an optical information recording medium No. 1 according to the present invention.

The recording medium No. 1 was subjected to laser recording by use of a semiconductor laser (made by Matsushita Electric Industrial Co., Ltd.) capable of emitting laser beams with a wavelength of 820 nm and with a pulse width of 1 μsec under the conditions that the illumination power applied to the recording medium was 4 mW on the surface of the recording layer, while the recording medium was moved at a speed of 910 μm/sec.

The molecular extinction coefficient and recording sensitivity of the recording medium No. 1 are shown in Table 1.

EXAMPLES 2 THROUGH 4

Example 1 was repeated except that the dichlorotin [hexadecafluorophthalocyanine] employed in Example 1 was replaced by the respective metalo-hexadecafluorophthalocyanine listed in Table 1.

The molecular extinction coefficient and recording sensitivity of each of the recording mediums No. 2 through No. 4 are shown in Table 1.

TABLE 1

| Example | Metalo-Phthalocyanine | Maximum Absorption ($\log_e$*) nm | Recording Sensitivity (nJ/bit) |
|---|---|---|---|
| 1 | Dichlorotin[hexadecafluorophathalocyanine] | 710(4.3), 756(4.8) 792(5.0) | 2.0 |
| 2 | [Hexadecafluorophthalocyanine] copper | 714(4.4), 761(4.7) 779(4.8), 821(4.7) | 1.5 |
| 3 | [Hexandecafluorophthalocyanine] zinc | 700(3.9), 736(4.0) 780(4.5), 820(4.4) | 1.5 |
| 4 | [Hexandecafluorophthalocyanine] lead | 700, 740, 780, 840, 880 | 1.0 |

*Molecular Extinction Coefficient

COMPARATIVE EXAMPLES 1 THROUGH 5

Example 1 was repeated except that the dichlorotin [hexadecafluorophthalocyanine] was replaced by the respective metalo-phthalocyanines listed in Table 2, whereby comparative recording mediums No. 1 through No. 5 were prepared.

The molecular extinction coefficient and recording sensitivity of each of the comparative recording mediums No. 1 through No. 5 are shown in Table 2.

TABLE 2

| Comparative Example | Metalo-Phthalocyanine | Maximum Absorption | Recording Sensitivity |
|---|---|---|---|
| 1 | Dichlorotin[phthalocyanine] | Almost no absorption of light with a wavelength of 700 nm or more | Recording impossible |
| 2 | [Phthalocyanine] copper | | |
| 3 | [Hexaphthalocyanine] copper | | |
| 4 | [Phthalocyanine] zinc | | |
| 5 | [Phthalocyanine] lead | | 1.6 nJ/bit |

What is claimed is:

1. An optical information recording medium capable of recording optical information thereon by application of high density energy beams thereto, the recorded information being thereafter reproducible therefrom, comprising:
   a transparent base; and
   a recording layer on said base so that high density energy beams can be transmitted through said base and applied to said recording layer, said recording layer comprising a fluorophthalocyanine compound of the following formula and capable of absorbing light having a wave length of 700 nm or more:

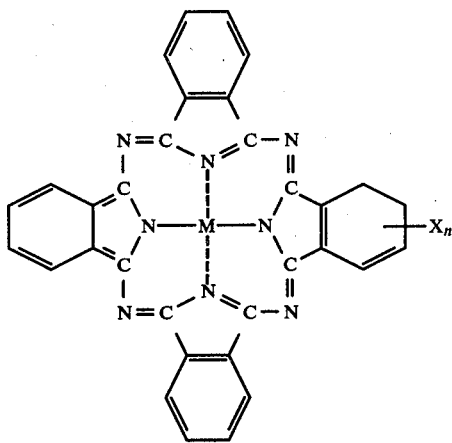

wherein M is a member selected from the group consisting of hydrogen, a metal, a metal oxide and a metal halide, X is fluorine, and n is an integer from 1 to 16.

2. An optical information recording medium as claimed in claim 1, wherein M is a member selected from the group consisting of copper, beryllium, magnesium, calcium, zinc, cadmium, barium, aluminum, tin, lead, vanadium, chromium, manganese, iron, cobalt and nickel.

3. An optical information recording medium as claimed in claim 1, wherein M is a member selected from the group consisting of titanium oxide and vanadium oxide.

4. An optical information recording medium as claimed in claim 1, wherein M is tin halide.

5. An optical information recording medium as claimed in claim 1, wherein said recording layer contains as a binder agent a resin selected from the group consisting of vinylchloride resin, vinyl acetate resin, acrylic resin, methacrylic resin, polyester resin, nitrocellulose, polyethylene, polypropylene, polyamide, polystyrene, polycarbonate and epoxy resin.

6. An optical information recording medium as claimed in claim 1, wherein the thickness of said recording layer is in the range of 100 Å to 5 μm.

7. An optical information recording medium as claimed in claim 1, further comprising a protective layer on the upper surface of said recording layer, said protective layer being transparent to said high energy beams and substantially unreactive with said recording layer.

8. An optical information recording medium as claimed in claim 7, wherein said protective layer has a thickness ranging from 50 Å to 5000 Å, and comprises an inorganic material selected from the group consisting of $Al_2O_3$, $SiO_2$, SiO, MaO, ZnO, $MgF_2$ and $CuF_2$.

9. An optical information recording medium as claimed in claim 7, wherein said protective layer has a thickness of ranging from 0.1 μm to 5 μm and comprises an organic resin selected from the group consisting of polystyrene, polyester, polycarbonate, polyxylene, polyvinylchloride, polyacrylonitrile, polymethacrylonitrile, polyacrylate, polymethacrylate, polyvinyl acetate, polyethylene, polypropylene, epoxy resin, polyamide, polyurea, phenol resin, and copolymers of said polymers.

10. An optical information recording medium as claimed in claim 1, wherein said base is made of a member selected from the group consisting of vinyl chloride resin, vinyl acetate resin, acrylic resin, methacrylic resin, polyester resin, nitrocellulose, polyethylene, polypropylene, polyamide, polystyrene, polycarbonate and epoxy resin.

11. An optical information recording medium as claimed in claim 1, in which M is selected from the group consisting of tin, copper, zinc and lead, and X is 16.

12. An optical information recording medium as claimed in claim 1, in which the lower surface of said recording layer is in direct surface-to-surface contact with the upper surface of said transparent base.

* * * * *